United States Patent
Sato et al.

(10) Patent No.: US 9,550,469 B2
(45) Date of Patent: Jan. 24, 2017

(54) AIRBAG DEVICE

(71) Applicant: HONDA MOTOR CO., LTD., Tokyo (JP)

(72) Inventors: Masahiro Sato, Wako (JP); Kanichi Fukuda, Wako (JP); Yuichi Amakasu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/961,079

(22) Filed: Dec. 7, 2015

(65) Prior Publication Data

US 2016/0159312 A1  Jun. 9, 2016

(30) Foreign Application Priority Data

Dec. 5, 2014  (JP) .................................. 2014-246795

(51) Int. Cl.
| | |
|---|---|
| *B60R 21/233* | (2006.01) |
| *B60R 21/231* | (2011.01) |
| *B60R 21/205* | (2011.01) |
| *B60R 21/239* | (2006.01) |
| *B60R 21/00* | (2006.01) |

(52) U.S. Cl.
CPC ........... *B60R 21/231* (2013.01); *B60R 21/233* (2013.01); *B60R 21/205* (2013.01); *B60R 21/239* (2013.01); *B60R 2021/0032* (2013.01); *B60R 2021/23107* (2013.01)

(58) Field of Classification Search
CPC .... B60R 21/233; B60R 21/205; B60R 21/239; B60R 2021/0032
See application file for complete search history.

(56) References Cited

U.S. PATENT DOCUMENTS

| | | | | |
|---|---|---|---|---|
| 4,262,931 A | * | 4/1981 | Strasser ................ | B60R 21/233 280/729 |
| 5,575,497 A | * | 11/1996 | Suyama ................ | B60R 21/231 280/730.1 |
| 9,272,684 B1 | * | 3/2016 | Keyser .................. | B60R 21/237 |
| 2007/0126217 A1 | * | 6/2007 | Nayef ................... | B60R 21/205 280/732 |
| 2013/0001934 A1 | * | 1/2013 | Nagasawa ............. | B60R 21/233 280/731 |
| 2015/0054267 A1 | * | 2/2015 | Komamura ........... | B60R 21/276 280/735 |

(Continued)

FOREIGN PATENT DOCUMENTS

| | | | |
|---|---|---|---|
| JP | 2009-247194 A | 10/2009 | |
| JP | 2014218215 A | * 11/2014 | ............. B60R 21/20 |

OTHER PUBLICATIONS

Translation of JP2014218215A.*

*Primary Examiner* — Faye M Fleming
(74) *Attorney, Agent, or Firm* — Westerman, Hattori, Daniels & Adrian, LLP

(57) ABSTRACT

An airbag device includes a main airbag unit with a main bag body that is inflated and deployed from a front side of a front seat when impact is input, and a supplemental airbag unit with a supplemental bag body that is inflated and deployed from a side portion of the main airbag unit when impact is input. The supplemental bag body comes into contact with the main bag body when inflated and deployed and restricts inflation and deployment of the main bag body.

8 Claims, 10 Drawing Sheets

(56) References Cited

U.S. PATENT DOCUMENTS

| | | | |
|---|---|---|---|
| 2015/0166002 A1* | 6/2015 | Fukawatase | B60R 21/233 280/730.1 |
| 2015/0175116 A1* | 6/2015 | Cho | B60R 21/205 280/729 |
| 2015/0343986 A1* | 12/2015 | Schneider | B60R 21/205 280/729 |
| 2015/0367802 A1* | 12/2015 | Fukawatase | B60R 21/205 280/732 |

* cited by examiner

AIRBAG DEVICE

CROSS REFERENCES TO RELATED APPLICATIONS

The present application claims priority under 35 U.S.C. §119 to Japanese Patent Application No. 2014-246795, filed Dec. 5, 2014, entitled "AIRBAG DEVICE." The contents of this application are incorporated herein by reference in their entirety.

BACKGROUND

1. Field

The present application relates to an airbag device that protects an occupant seated on a front seat of a vehicle.

2. Description of the Related Art

An airbag device with a bag body that is inflated and deployed to protect an occupant when impact is input is provided in front of the driver seat or the passenger seat of a vehicle. The airbag device is arranged inside a steering wheel or an instrument panel as an airbag unit including an inflator that generates high-pressure gas when impact is input and a bag body that is inflated and deployed on receiving the gas of the inflator (see, for example, Japanese Patent No. 5470222).

A bag body of an airbag device arranged in front of a front seat of a vehicle, particularly the bag body of the airbag device arranged in front of the passenger seat, might come into contact with a peripheral member when inflated and deployed before coming into contact with the occupant seated on the seat. Specifically, as to the airbag device arranged in front of the passenger seat for example, the bag body that is inflated and deployed might come into contact with a projecting portion of an instrument panel or a shift panel, a console box, or the like, which is placed centrally in the vehicle width direction.

When impact is input from the front side of the vehicle, relative movement of the occupant seated on the seat is caused toward the front of the vehicle. Thus, to efficiently absorb the impact on the occupant who moves forward, it is desirable that the bag body be inflated and deployed stably on the central axis of the upper body of the occupant seated on the seat. However, as described above, if the bag body of the airbag device comes into contact with a peripheral member before completing the deployment, it is difficult for the bag body to be oriented in a desired direction and be stably inflated and deployed.

SUMMARY

Thus, the present application is aimed at providing an airbag device that enables a main bag body of a main airbag unit to be stably inflated and deployed in a desired direction when impact is input.

To address the above-described problem, an airbag device according to the present application includes a main airbag unit (e.g. a main airbag unit 13 in an embodiment) with a main bag body (e.g. a main bag body 18 in an embodiment) that is inflated and deployed from a front side (i.e., a front panel side such as a dashboard or instrumental panel) of a front seat (e.g. a seat 11 in an embodiment) when impact is input, and a supplemental airbag unit (e.g. a supplemental airbag unit 17 in an embodiment) with a supplemental bag body (e.g. a supplemental bag body 20 in an embodiment) that is inflated and deployed from a side portion of the main airbag (a side position adjacent to the main airbag position) unit when impact is input, the supplemental bag body corning into contact with the main bag body, when inflated and deployed, and restricting inflation and deployment of the main bag body.

According to the present application, when impact is input, the main bag body of the main airbag unit and the supplemental bag body of the supplemental airbag unit are inflated and deployed and the supplemental bag body comes into contact with the main bag body and thus, the main bag body is oriented in a desired direction and is stably inflated and deployed. As a result, an occupant can be stably supported by the main bag body.

The supplemental airbag unit may be arranged between a front position of a driver seat and a front position of a passenger seat. In this case, when impact is input from a diagonally front side of the vehicle and the upper body of the occupant is moved inward in the vehicle width direction, the supplemental bag body of the supplemental airbag unit can catch the upper body of the occupant.

The main bag body may come into contact with a side panel (e.g. a side panel 25 in an embodiment) of a vehicle interior when inflated and deployed and may be inflated and deployed while being sandwiched between the supplemental bag body and the side panel.

In this case, when impact is input, the inflated and deployed main bag body comes into contact with the supplemental bag body and the side panel and thus, the inflation and deployment direction of the main bag body is restricted from both the right and left sides. Accordingly, the main bag body can be inflated and deployed in a more desirable direction.

The supplemental airbag unit may be provided between a front position of the driver seat and a front position of the passenger seat and also at an outside position of the main airbag unit in a vehicle width direction.

In this case, when impact is input, the inflated and deployed main bag body comes into contact with the right and left supplemental bag bodies and thus, the inflation and deployment direction of the main bag body is restricted from both the right and left sides. Accordingly, the main bag body can be inflated and deployed in a more desirable direction and in addition, compared to the case in which the main bag body is caused to come into contact with the side panel of the vehicle interior, the inflation and deployment direction of the main bag body can be restricted earlier by the inflated and deployed supplemental bag body.

The supplemental bag body may come into contact with the main bag body provided at a front position of the passenger seat and with a steering wheel (e.g. a steering wheel 10 in an embodiment) arranged at a front position of the driver seat.

In this case, when impact is input, the inflated and deployed supplemental bag body comes into contact with the main bag body on the passenger seat side and the steering wheel on the driver seat side and thus, the inflation and deployment direction of the supplemental bag body is restricted. Accordingly, the inflation and deployment direction of the supplemental bag body is stabilized and thus, the inflation and deployment direction of the main bag body in contact with the supplemental bag body is stabilized as well.

It is desirable that respective vent holes of the main bag body and the supplemental bag body be arranged in regions in which the vent holes come into no mutual contact.

In this case, when the main bag body and the supplemental bag body are inflated and deployed, each vent hole is prevented from being blocked by the opposite member that is in contact. Accordingly, the gas emission performances of the main bag body and the supplemental bag body can be stabilized.

Portions of the main bag body and the supplemental bag body that come into mutual contact may each be provided with a member with high frictional resistance.

In this case, when the main bag body is in contact with the supplemental bag body, it is difficult for the mutual contact surfaces to slide, and the inflation and deployment direction of the main bag body is stably restricted.

The supplemental bag body may complete inflation and deployment earlier than the main bag body when impact is input.

In this case, when impact is input, the main bag body comes into contact with the supplemental bag body that completes the inflation and deployment earlier and thus, the restriction of the main bag body using the supplemental bag body is stabilized.

DESCRIPTION OF THE PREFERRED EMBODIMENTS

Embodiments of the present application are described below with reference to the drawings. In each embodiment, the same references are given to the same parts and overlapping description on such parts is omitted.

A first embodiment illustrated in FIGS. 1 to 4 is described first.

Figure 1:
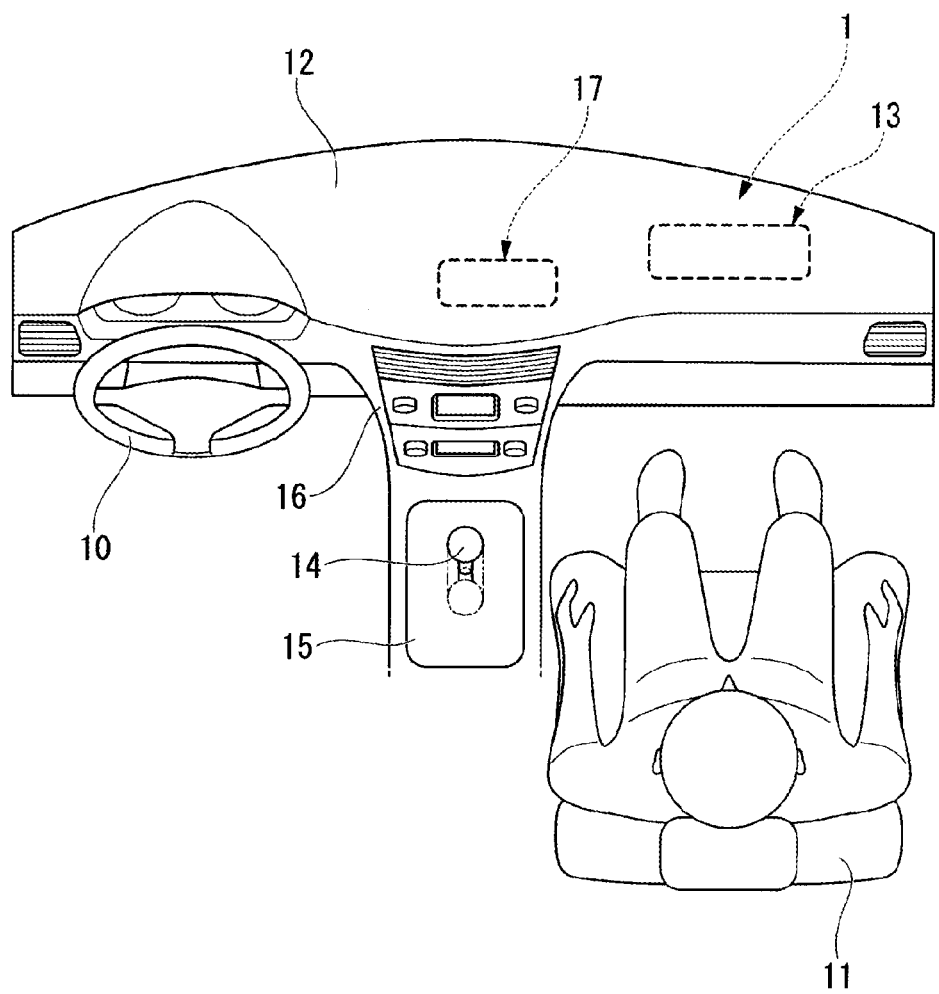
FIG. 1 is a plan view of a front part of the interior of a vehicle according to a first embodiment of the present application.
Figure 2:
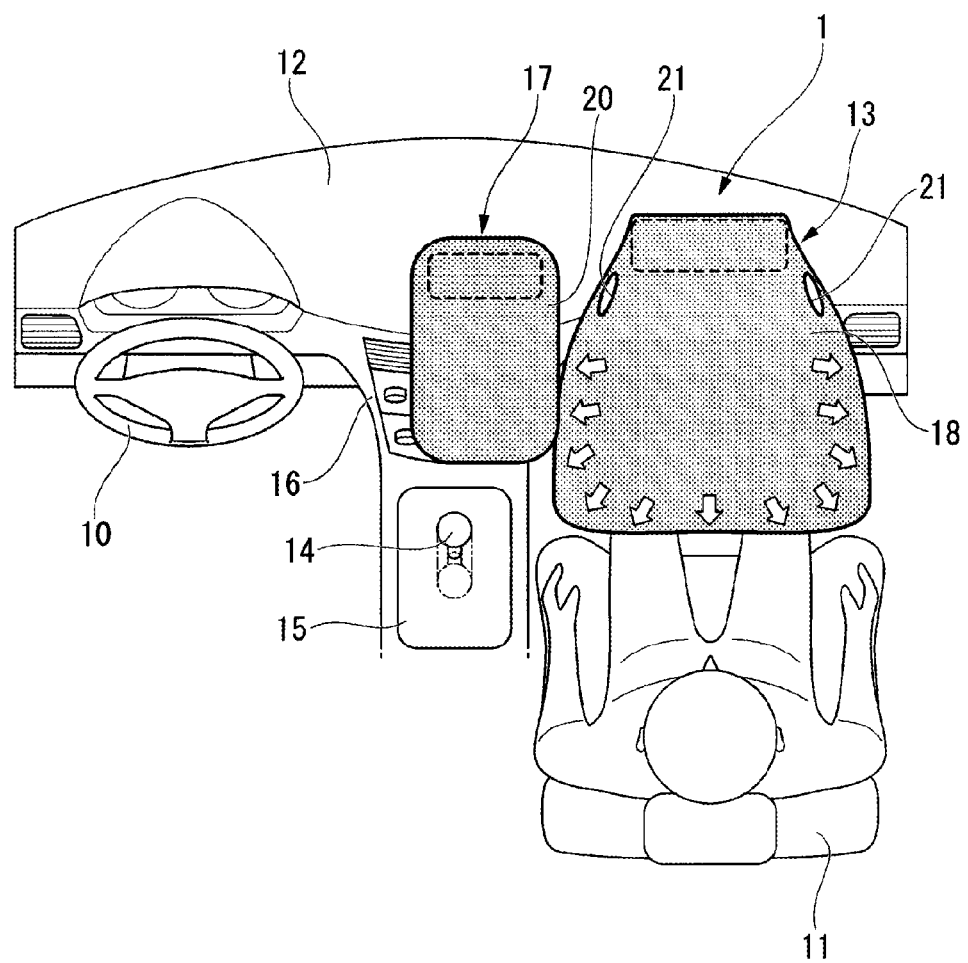
FIG. 2 is a plan view of the front part of the interior of the vehicle according to the first embodiment of the present application.
Figure 3:
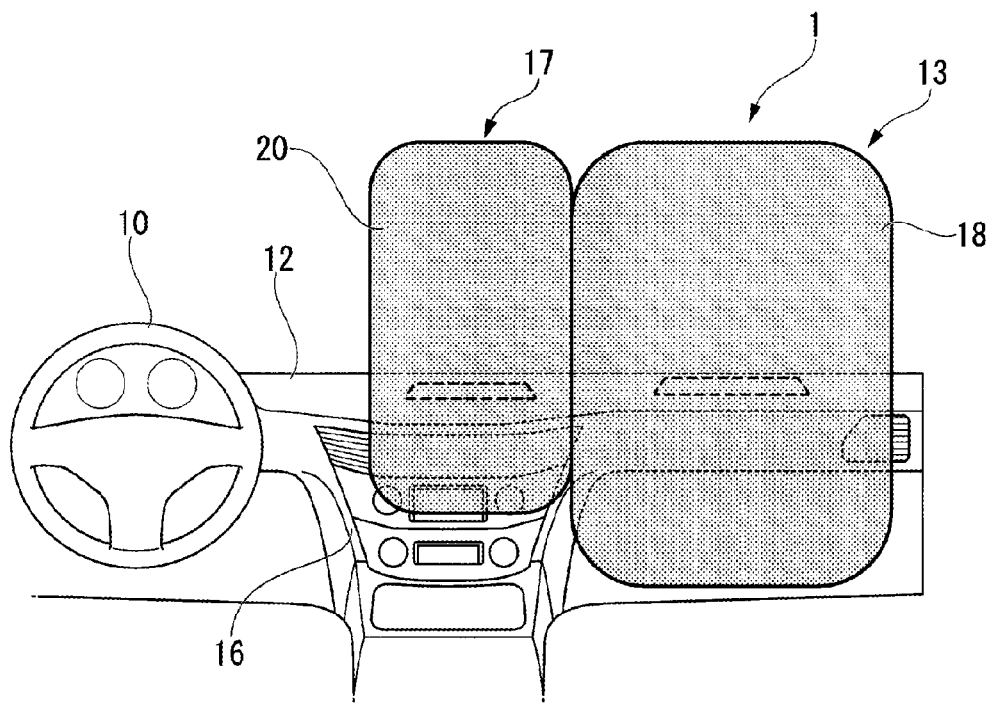
FIG. 3 is a front view of the front part of the interior of the vehicle according to the first embodiment of the present application.
Figure 4:
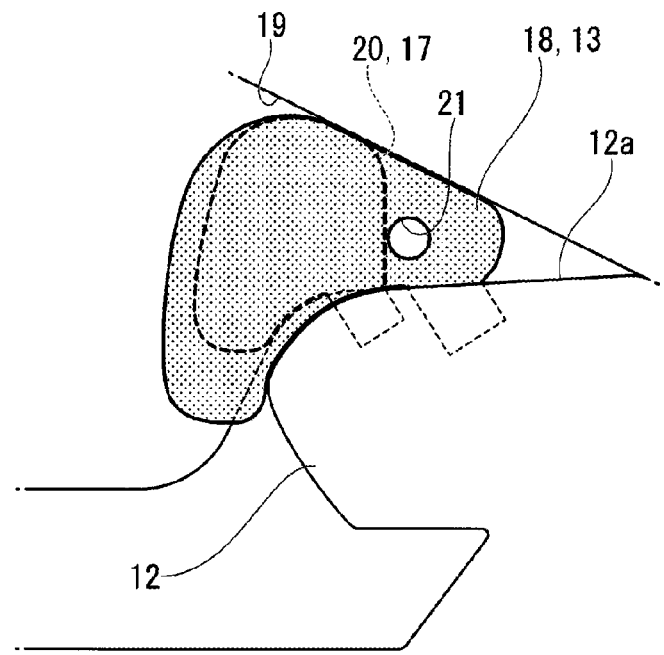
FIG. 4 is a right side view of the front part of the interior of the vehicle according to the first embodiment of the present application.

FIG. 1 illustrates the interior of a vehicle according to the first embodiment and FIGS. 2 to 4 illustrate a state in which an airbag device 1 in the interior of the vehicle in FIG. 1 is deployed.

The vehicle according to the present embodiment employs so-called left-hand drive, in which the driver seat is arranged on the left side of the vehicle interior and the passenger seat is arranged on the right side of the vehicle interior, and a steering wheel 10 is arranged on the left side of the vehicle interior. A main airbag unit 13 for the passenger seat is installed inside an instrument panel 12 in front of a seat 11, which is the passenger seat. Although the illustration and detailed description are omitted herein, a known airbag unit is installed in a central portion of the steering wheel 10 as well.

The instrument panel 12 is arranged across the front portion of the driver seat and the passenger seat, and a shift panel 15 provided with a shift lever 14 that protects is arranged between driver seat and the passenger seat. The shift panel 15 is provided in an elevated position, which is above the floors of the driver seat and the passenger seat. The front portion of the shift panel 15 is arranged so as to be continuous with a center panel 16 that is continuously provided in a central portion of the instrument panel 12 in the vehicle width direction. The center panel 16 is provided with operation parts of an audio device, an air conditioner, and the like.

The airbag device 1 according to the present embodiment includes the above-described main airbag unit 13, which is installed inside the instrument panel 12 in front of the seat 11 as the passenger seat, and a supplemental airbag unit 17, which is installed inside the instrument panel 12 and between a front position of the driver seat and a front position of the passenger seat.

The main airbag unit 13 includes an inflator (not illustrated), which generates high-pressure gas when impact is input, and a main bag body 18, which is deployed on receiving the gas pressure of the inflator. The main bag body 18 is attached to the inside of the instrument panel 12 together with the inflator in a folded state. When impact is input, the main bag body 18 is inflated on receiving the gas pressure of the inflator and deployed by breaking a break inducing portion (not illustrated), that is, a tear line, which is provided in a top surface 12a of the instrument panel 12. As illustrated in FIG. 4, the main bag body 18 that has broken the break inducing portion comes into contact with the inner surface of a front windshield glass 19 and the top surface 12a of the instrument panel 12, and is inflated and deployed in the direction toward the seat 11, that is, in the direction toward the occupant seated on the seat 11.

The supplemental airbag unit 17 includes an inflator (not illustrated), which generates high-pressure gas when impact is input, and a supplemental bag body 20, which is deployed on receiving the gas pressure of the inflator. The supplemental bag body 20 is attached to the inside of a region of the instrument panel 12, which is positioned centrally in the vehicle width direction, together with the inflator in a folded state. When impact is input, the supplemental bag body 20 is inflated on receiving the gas pressure of the inflator and deployed by breaking a break inducing portion (not illustrated), that is, a tear line, which is provided centrally in the vehicle width direction in the top surface 12a of the instrument panel 12. Similar to the main bag body 18, the supplemental bag body 20 comes into contact with the inner surface of the front windshield glass 19 and the top surface 12a of the instrument panel 12, and is inflated and deployed toward the upper rear side of the vehicle body.

As illustrated in FIGS. 2 and 3, a right side surface of the inflated and deployed supplemental bag body 20 comes into contact with a left side surface of the main bag body 18. Accordingly, the deployment direction of the main bag body 18 is corrected in the direction straight toward the seat 11, which is the direction toward the front of the occupant seated on the seat 11.

Each of the main bag body 18 and the supplemental bag body 20 includes a vent hole for causing the gas to escape outside from a predetermined position at the time of inflation and deployment. Although only a vent hole 21 of the main bag body 18 is illustrated in FIG. 4, the supplemental bag body 20 also includes a similar vent hole. The vent holes of the main bag body 18 and the supplemental bag body 20 are formed in regions where the vent holes come into no mutual contact when the main bag body 18 and the supplemental bag body 20 are inflated and deployed.

A member with stickiness, that is, with high frictional resistance, such as silicon rubber, is applied in regions included in the outer surfaces of the main bag body 18 and the supplemental bag body 20, where the main bag body 18 and the supplemental bag body 20 come into contact with each other and with the inner surface of the front windshield glass 19 and the top surface 12a of the instrument panel 12 when inflated and deployed.

The capacity of the supplemental bag body 20 is set smaller than the capacity of the main bag body 18, and when the main bag body 18 and the supplemental bag body 20 start inflation and deployment at the same time, the supplemental bag body 20 is set ending the inflation and deployment earlier. Accordingly, when impact is input, supplemental bag body 20 completes the inflation and deployment earlier and the main bag body 18 being inflated and deployed comes into contact with the supplemental bag body 20.

In the above-described structure, when impact is input from the front side of the vehicle, the inflators of the main airbag unit 13 and the supplemental airbag unit 17 generate high-pressure gas, and on receiving the gas pressure, the main bag body 18 and the supplemental bag body 20 break the top surface 12a of the instrument panel 12 to start inflation and deployment. At the time, as illustrated in FIGS. 2 and 3, the main bag body 18 and the supplemental bag body 20 are inflated toward the rear side of the vehicle body to be deployed while being also inflated to the right and left sides and to the front side. The inflation and deployment is completed by the supplemental bag body 20 earlier and after that, the left side surface of the main bag body 18 that continues the inflation and deployment comes into contact with the right side surface of the supplemental bag body 20. Thus, inward inflation and deployment of the main bag body 18, which is in the vehicle width direction, is restricted.

According to the airbag device 1 of the present embodiment, when impact is input, the supplemental bag body 20 of the supplemental airbag unit 17 is inflated and deployed to come into contact with the main bag body 18 of the main airbag unit 13 and thus, inward inflation and deployment of the main bag body 18, which is in the vehicle width direction, can be restricted. As a result, the main bag body 18 of the main airbag unit 13 can be oriented in a desired direction and be stably inflated and deployed, and an occupant can be stably supported by the main bag body 18.

Since in the airbag device 1 according to the present embodiment, the supplemental airbag unit 17 is arranged between the front position of the driver seat and the front position of the passenger seat, when impact is input, the supplemental bag body 20 comes into contact with the main bag body 18 to restrict the inflation and deployment direction of the main bag body 18 and in addition, the inflated and deployed supplemental bag body 20 itself can also catch the move of an occupant. Particularly, although when impact is input from a diagonally front side of the vehicle, the occupant seated on the seat 11 is caused to move in a diagonally forward direction, which is close to the inside in the vehicle width direction, the move of the occupant can be caught by the supplemental bag body 20. At the time, since the right side portion of the supplemental bag body 20 comes into contact with the main bag body 18 and the supplemental bag body 20 is supported by the main bag body 18, the load of the occupant can be stably caught.

Since in the airbag device 1 according to the present embodiment, the vent hole 21 of the main bag body 18 and the vent hole of the supplemental bag body 20 are provided in the regions where the vent holes come into no mutual contact, the gas inside the main bag body 18 and the supplemental bag body 20 can be caused to escape as desired when the main bag body 18 and the supplemental bag body 20 are inflated and deployed and the contact impact on an occupant can be reduced.

Further, since in the airbag device 1 according to the present embodiment, a member with stickiness, such as silicon rubber, is applied in the regions included in the outer surfaces of the main bag body 18 and the supplemental bag body 20, where the main bag body 18 and the supplemental bag body 20 come into contact with each other when inflated and deployed, a slide on the surfaces that are in mutual contact during the inflation and deployment can be prevented. Thus, the inflation and deployment direction of the main bag body 18 can be stably restricted by employing the above-described structure.

In the present embodiment, a member with stickiness, such as silicon rubber, also applied in the regions included in the outer surfaces of the main bag body 18 and the supplemental bag body 20, where the main bag body 18 and the supplemental bag body 20 come into contact with the inner surface of the front windshield glass 19 and the top surface 12a of the instrument panel 12. Thus, the main bag body 18 and the supplemental bag body 20 can be prevented from sliding on the inner surface of the front windshield glass 19 or the top surface 12a of the instrument panel 12 when inflated and deployed. Accordingly, the inflation and deployment of the main bag body 18 and the supplemental bag body 20 toward the rear side of the vehicle body can be also stabilized.

Moreover, in the airbag device 1 according to the present embodiment, the capacity of the supplemental bag body 20 is set smaller than the capacity of the main bag body 18, and at the time of the inflation and deployment, the supplemental bag body 20 completes the inflation and deployment earlier than the main bag body 18 to restrict the inflation and deployment of the main bag body 18. Thus, the restriction of the main bag body 18 using the supplemental bag body 20 can be stabilized.

Although in the present embodiment, the inflation and deployment of the supplemental bag body 20 is caused to be complete earlier by setting the capacity of the supplemental bag body 20 smaller than the capacity of the main bag body 18, the inflation and deployment of the supplemental bag body 20 may be caused to be complete earlier than the inflation and deployment of the main bag body 18 by shifting an injection timing of the gas of the inflator.

Figure 5:
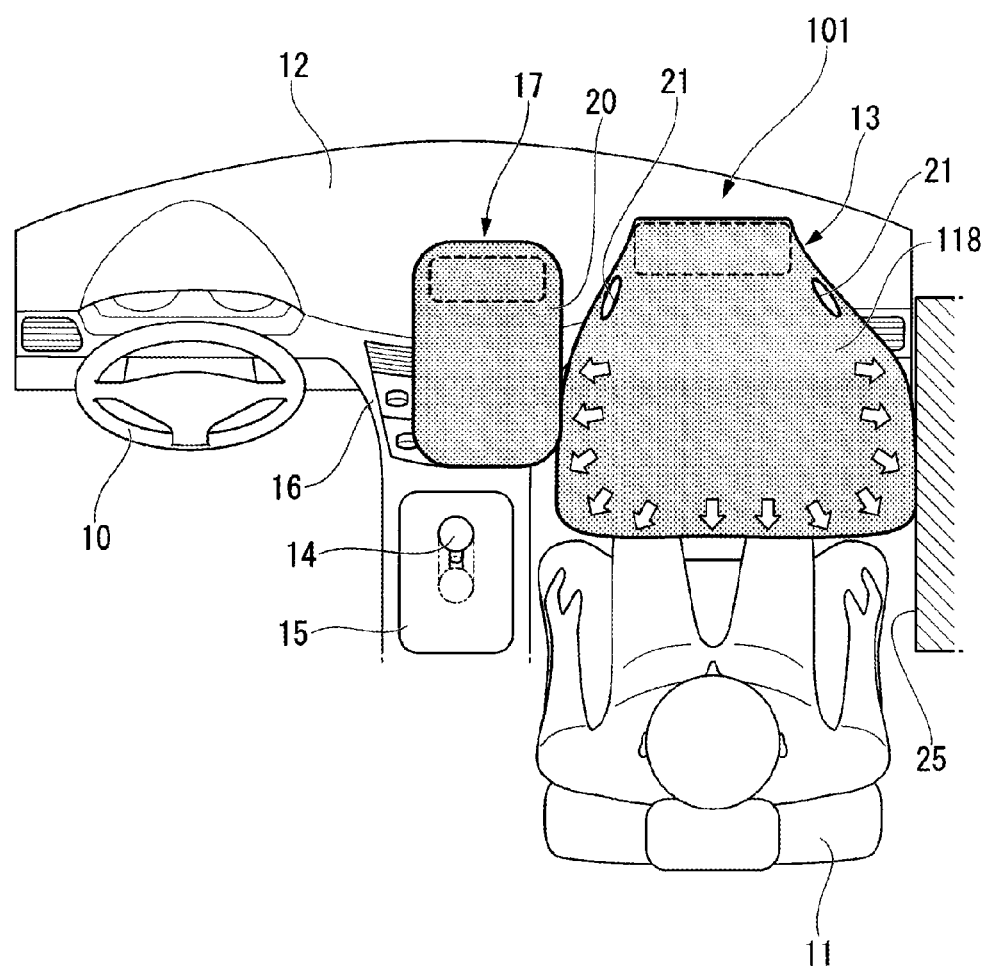
FIG. 5 is a plan view of a front part of the interior of a vehicle according to a second embodiment of the present application.
Figure 6:
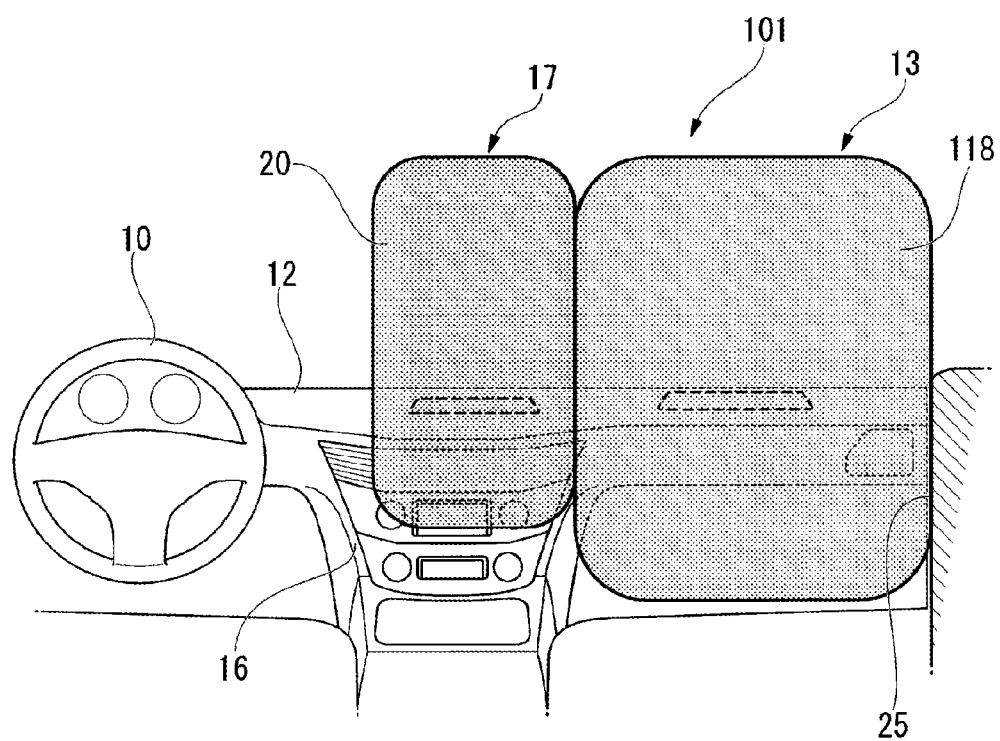
FIG. 6 is a front view of the front part of the interior of the vehicle according to the second embodiment of the present application.

A second embodiment illustrated in FIGS. 5 and 6 is now described. FIGS. 5 and 6 each illustrate a state in which an airbag device 101 in the interior of a vehicle according to the second embodiment is deployed.

Although the basic structure of the airbag device 101 according to the second embodiment is almost similar to the structure of the airbag device 1 according to the first embodiment, the airbag device 101 is different from the airbag device 1 according to the first embodiment in that a main bag body 118 comes into contact with a side panel 25 of a right side portion of the vehicle interior, which is a door panel for example, when inflated and deployed.

According to the airbag device 101 of the second embodiment, when impact is input, the main bag body 118 comes into contact with a supplemental bag body 20 on the left side and the side panel 25 on the right side of the vehicle interior and is inflated and deployed while being sandwiched between the supplemental bag body 20 and the side panel 25.

Thus, according to the airbag device 101 of the present embodiment, the inflation and deployment direction of the main bag body 18 is restricted by the supplemental bag body 20 and the side panel 25 from both the right and left sides and thus, the main bag body 118 can be stably deployed in a more desirable direction.

Figure 7:
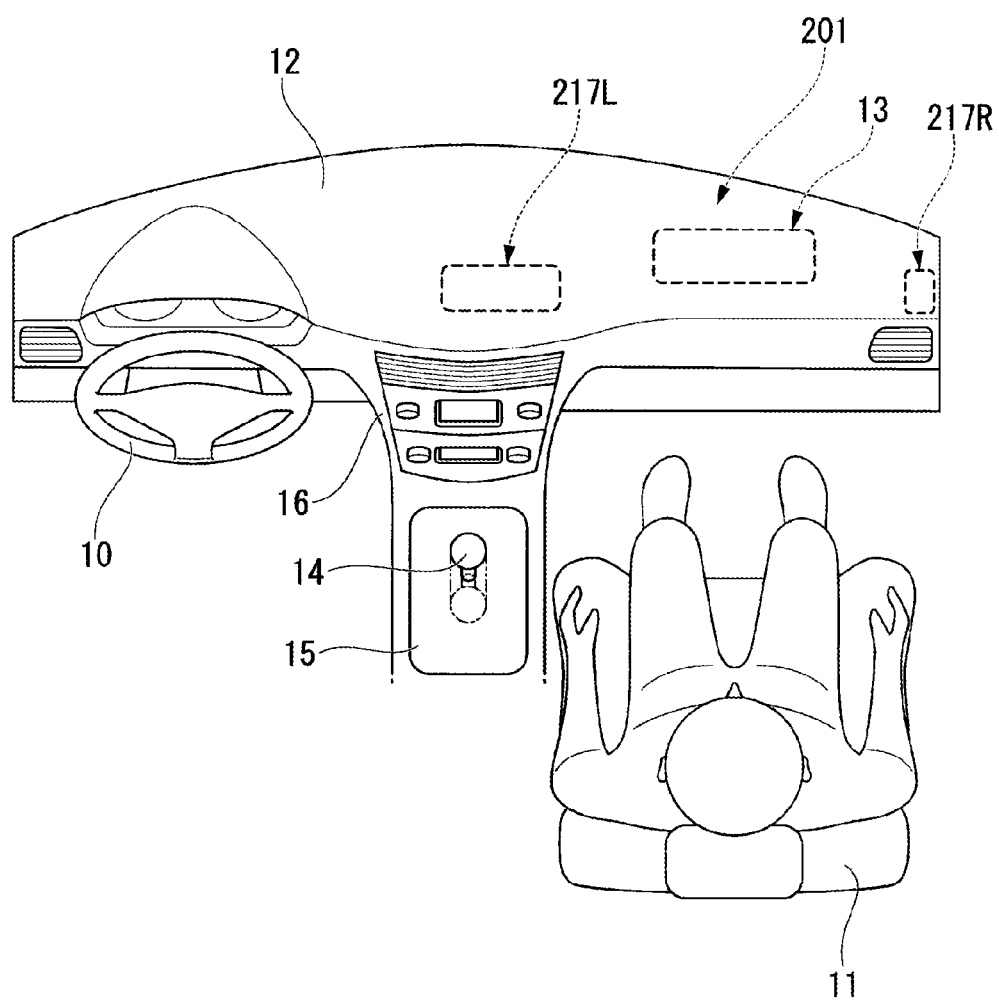
FIG. 7 is a plan view of a front part of the interior of a vehicle according to a third embodiment of the present application.
Figure 8:
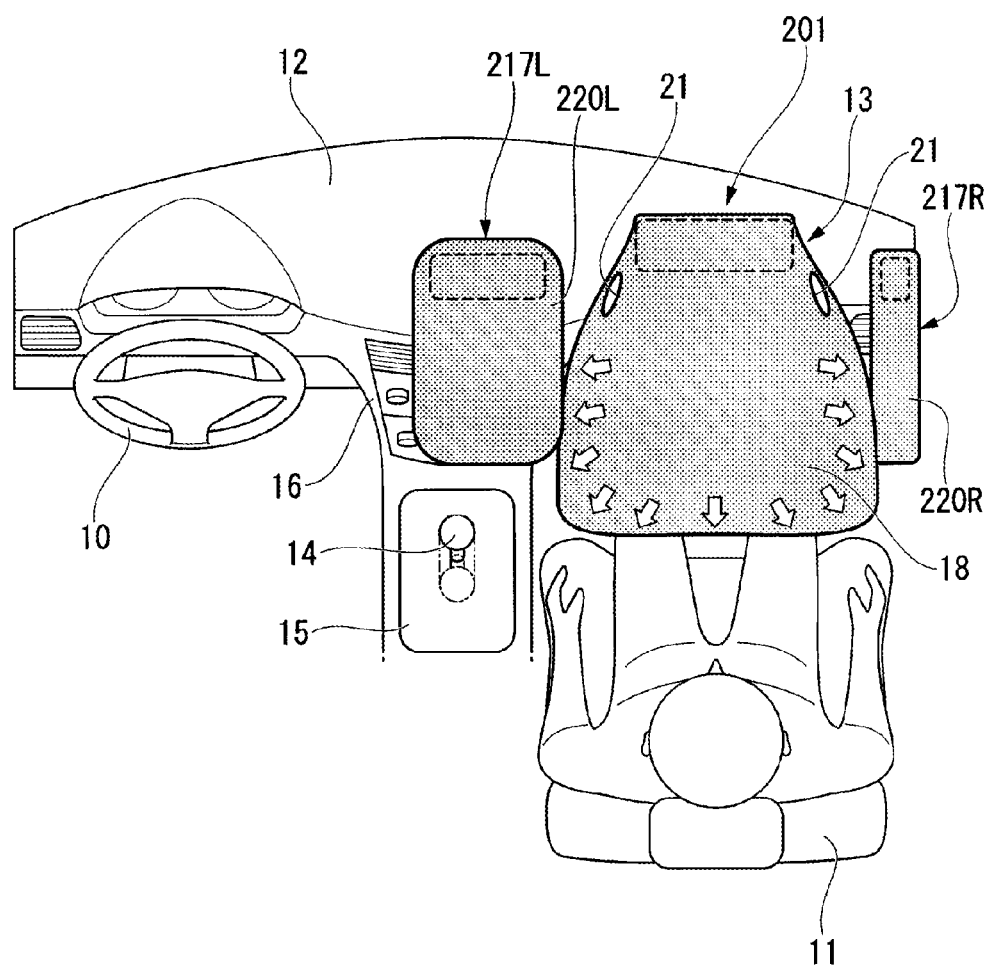
FIG. 8 is a plan view of the front part of the interior of the vehicle according to the third embodiment of the present application.
Figure 9:
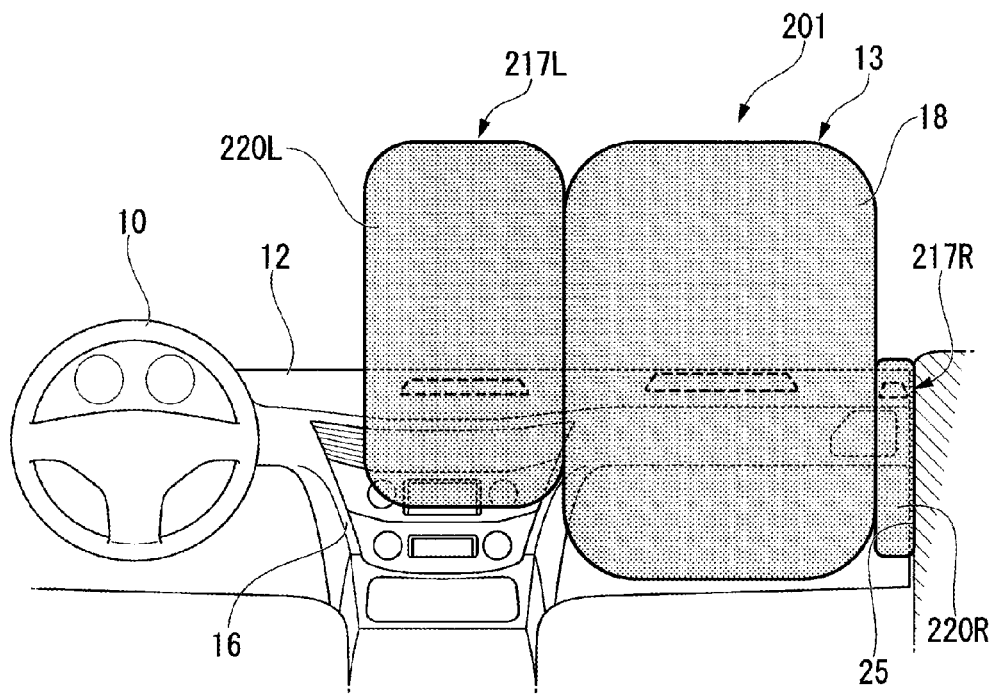
FIG. 9 is a front view of the front part of the interior of the vehicle according to the third embodiment of the present application.
Figure 10:
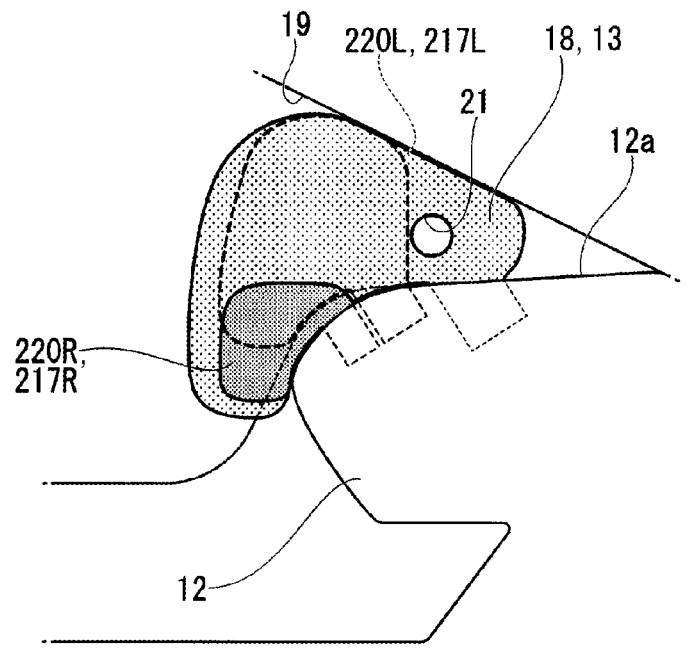
FIG. 10 is a right side view of the front part of the interior of the vehicle according to the third embodiment of the present application.

FIGS. 7 to 10 illustrate a third embodiment. FIG. 7 illustrates the interior of a vehicle according to the third embodiment, and FIGS. 8 to 10 illustrate a state in which an airbag device 201 in the interior of the vehicle in FIG. 7 is deployed.

The airbag device 201 according to the third embodiment includes a main airbag unit 13 installed inside an instrument panel 12 in front of a seat 11, which is the passenger seat, a first supplemental airbag unit 217L installed in the instrument panel 12 and between a front position of the driver seat and a front position of the passenger seat, and a second supplemental airbag unit 217R installed in the instrument panel 12 and in a right side portion of the main airbag unit 13. The first supplemental airbag unit 217L includes a first supplemental bag body 220L that is inflated and deployed when impact is input, and the second supplemental airbag unit 217R includes a second supplemental bag body 220R that is inflated and deployed when impact is input. The first supplemental bag body 220L and the second supplemental bag body 220R break the top surface of the instrument panel 12 when impact is input, and change the respective orientations toward the rear side of the vehicle body to be inflated and deployed.

According to the airbag device 201 of the third embodiment, when impact is input, a main bag body 18 comes into contact with the first supplemental bag body 220L on the left side and the second supplemental bag body 220R on the right side and is inflated and deployed while being sandwiched between the first supplemental bag body 220L and the second supplemental bag body 220R. Each of the first supplemental bag body 220L and the second supplemental bag body 220R is set so as to have a capacity smaller than the capacity of the main bag body 18 and to complete the inflation and deployment earlier than the main bag body 18.

According to the airbag device 201 of the third embodiment, since the inflation and deployment direction of the main bag body 18 is restricted by the first supplemental bag body 220L and the second supplemental bag body 220R from both the right and left sides, the main bag body 18 can be stably deployed in a more desirable direction.

Particularly, compared to the case in which a right side portion of the main bag body 18 is caused to come into contact with a side panel of the vehicle interior, the second supplemental bag body 220R is instantaneously inflated and deployed and the right side portion of the main bag body 18 can be restricted and thus, the inflation and deployment position of the main bag body 18 can be stabilized early.

Although in the above-described third embodiment, the second supplemental airbag unit 217R is installed in the right side portion of the main airbag unit 13 inside the instrument panel 12, the supplemental airbag unit that comes into contact with the right side portion of the main bag body 18 when the main bag body 18 is inflated and deployed may be installed in a side panel 25 of the vehicle interior, which is a door panel for example. Further, the supplemental airbag unit that comes into contact with the right side portion of the main bag body 18 may be a side curtain airbag that is deployed downward from a ceiling portion of the vehicle interior.

Figure 11:
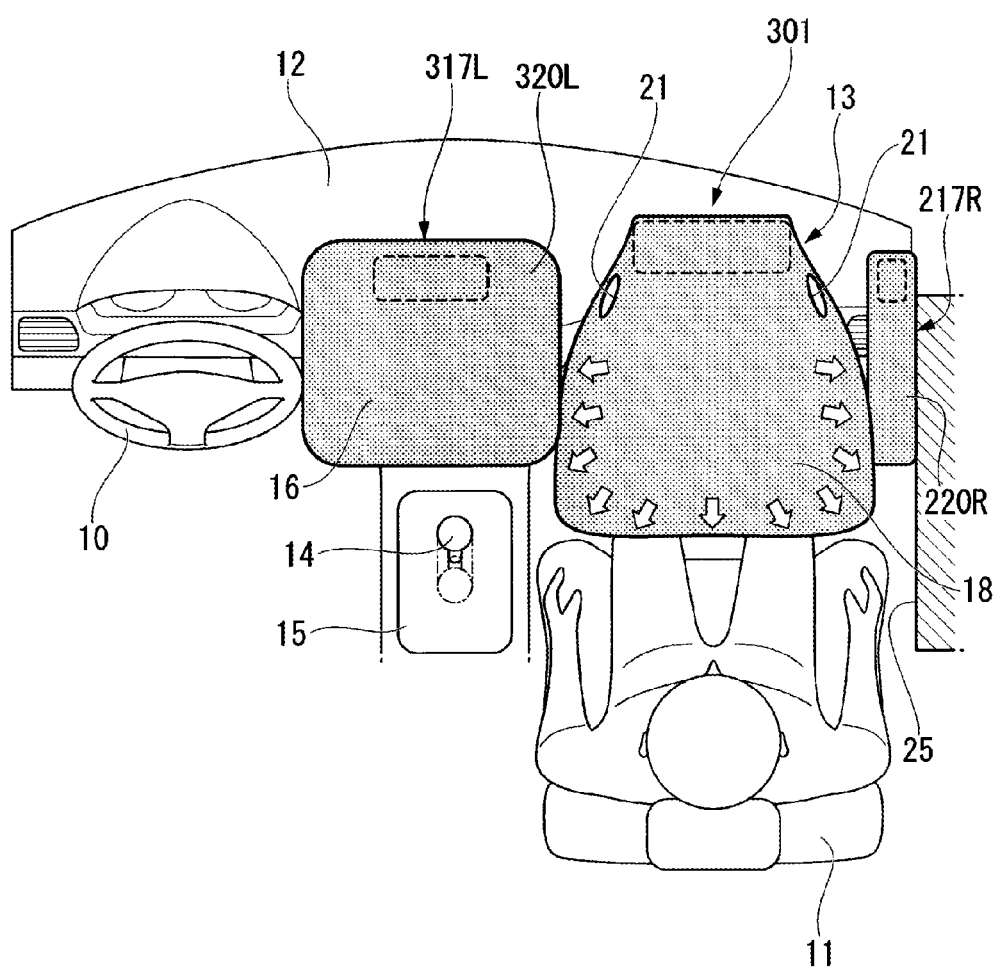
FIG. 11 is a plan view of a front part of the interior of a vehicle according to a fourth embodiment of the present application.
Figure 12:
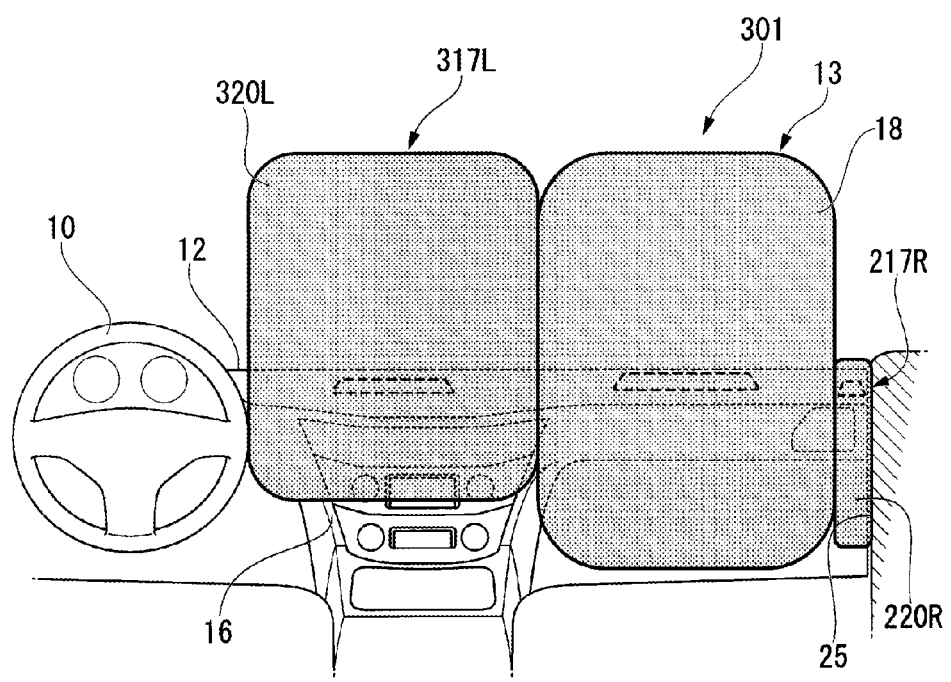
FIG. 12 is a front view of the front part of the interior of the vehicle according to the fourth embodiment of the present application.

FIGS. 11 and 12 illustrate a fourth embodiment. FIGS. 11 and 12 each illustrate a state in which an airbag device 301 in the interior of a vehicle according to the fourth embodiment is deployed.

Similar to the third embodiment, the airbag device 301 according to the fourth embodiment includes a main airbag unit 13, a first supplemental airbag unit 317L, and a second supplemental airbag unit 217R. A first supplemental bag body 320L of the first supplemental airbag unit 317L is set so as to come into contact with a steering wheel 10 of the driver seat too when inflated and deployed. The rest of the structure is almost similar to the structure according to the third embodiment.

According to the airbag device 301 of the fourth embodiment, when impact is input, a main bag body 18 comes into contact with the first supplemental bag body 320L on the left side and a second supplemental bag body 220R on the right side, and the main bag body 18 is inflated and deployed toward the rear side of the vehicle body while being sandwiched between the first supplemental bag body 320L and the second supplemental bag body 220R. At the time, the first supplemental bag body 320L that comes into contact with a left side surface of the main bag body 18 comes into contact with the steering wheel 10 of the driver seat as well and accordingly, displacement toward the left side is restricted.

According to the airbag device 301 of the fourth embodiment, when impact is input, the inflated and deployed first supplemental bag body 320L comes into contact with the main bag body 18 on the passenger seat side and the steering wheel 10 on the driver seat side and thus, the first supplemental bag body 320L is inflated and deployed while being sandwiched between the steering wheel 10 and the main bag body 18 from the right and left sides. Thus, the inflation and deployment direction of the first supplemental bag body 320L is stabilized and the inflation and deployment of the main bag body 18 that comes into contact with a right side surface of the first supplemental bag body 320L is also stabilized.

Accordingly, when the airbag device 301 is employed, in case of impact input, the occupant seated on a seat 11 can be caught more stably by the main bag body 18.

The present application is not limited to the above-described embodiments and various changes in design are possible within the scope not departing from the gist of the present application. For example, although in the above-described fourth embodiment, when impact is input, the inflated and deployed first supplemental bag body 320L comes into contact with the main bag body 18 on the passenger seat side and the steering wheel 10 on the driver seat side, the inflated and deployed first supplemental bag body 320L may be caused to come into contact with the main bag body 18 on the passenger seat side and a side surface of a bag body (not illustrated) positioned inside in the vehicle width direction, which is installed in the steering wheel 10 in front of the driver seat, or the like.

What is claimed is:

1. An airbag device for a vehicle, comprising:
   a main airbag unit installed to a front panel side in a position facing a front seat in the vehicle and provided with a main bag body configured to be inflated and deployed from the front panel side to the front seat in response to input of collision impact; and
   a supplemental airbag unit installed to the front panel side in a side position adjacent to the position of the main airbag unit in a vehicle width direction and provided with a supplemental bag body configured to be inflated and deployed from the side position in response to the input of the collision impact,
   wherein the supplemental bag body is configured to fully be inflated and deployed before the main bag body is fully inflated and deployed when the collision impact is input, and
   wherein the supplemental bag body is configured to be inflated and deployed to a position where the supplemental bag body comes into contact with the main bag body, thereby restricting a position of the main bag body during the inflation and deployment thereof.

2. The airbag device according to claim 1, wherein
   the main airbag unit is installed in the position which faces at least one of a driver seat and a passenger seat, and the supplemental airbag unit is installed in the position such that the supplemental bag body is inflated and deployed toward a position between the driver seat and the passenger seat.

3. The airbag device according to claim 2, wherein
   the main bag body is configured to be inflated and deployed to a position where the main bag body comes into contact with a side panel of the vehicle in a manner that restricts the position of the main bag body between the supplemental bag body and the side panel during the inflation and deployment of the main bag body.

4. The airbag device according to claim 2, wherein
   the supplemental airbag unit is installed in each side position adjacent to each side of the main airbag unit in the vehicle width direction, and each supplemental bag body is configured to be inflated and deployed from each side position.

5. The airbag device according to claim 2, wherein
   the main airbag unit is installed in the position which faces the passenger seat, and the supplemental bag body is configured to be inflated and deployed to a position where the supplemental bag body comes into contact with the main bag body and with a steering wheel arranged at the front panel side facing the driver seat.

6. The airbag device according to claim 1, wherein
   the main bag body and the supplemental bag body have respective vent holes and have surfaces which contact each other when inflated and deployed, the respective vent holes being provided to respective surface regions other than said surfaces to contact each other.

7. The airbag device according to claim 1, wherein
   the main bag body and the supplemental bag body have surfaces contacting each other when inflated and deployed, and said surfaces to contact each other have a member with high frictional resistance.

8. The airbag device according to claim 1, wherein
   a volume of the supplemental bag body is smaller than a volume of the main bag body.

* * * * *